June 24, 1924.
J. W. BULLER
TRACTOR GUIDE
Filed Sept. 15, 1923
1,499,289
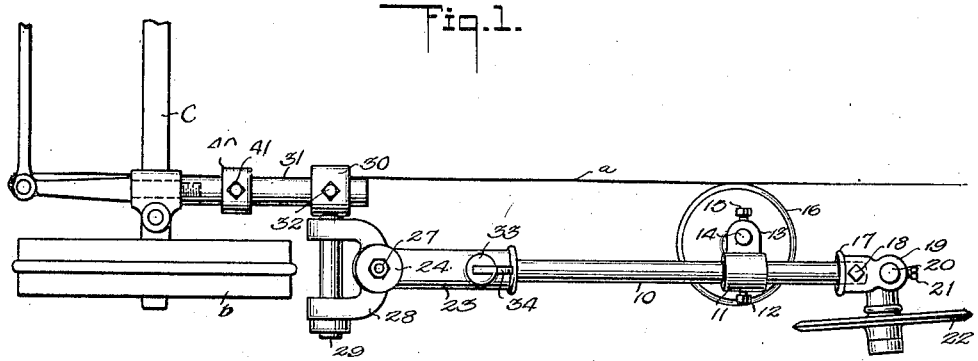
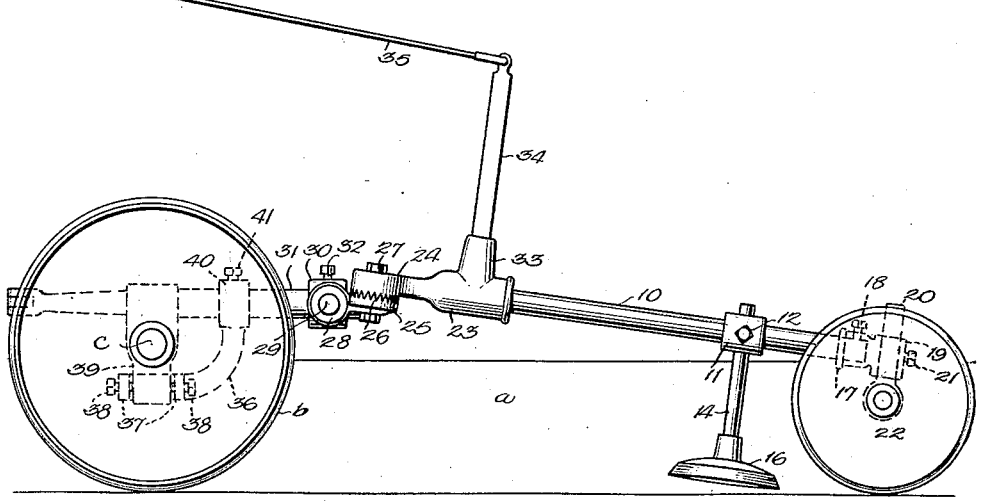
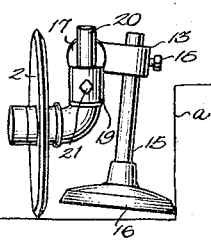
WITNESSES
INVENTOR
J. W. BULLER
BY
ATTORNEYS Patented June 24, 1924.

1,499,289

UNITED STATES PATENT OFFICE.

JACOB WIENS BULLER, OF HILLSBORO, KANSAS.

TRACTOR GUIDE.

Application filed September 15, 1923. Serial No. 662,977.

*To all whom it may concern:*

Be it known that I, JACOB WIENS BULLER, a citizen of the United States of America, and a resident of Hillsboro, in the county of Marion and State of Kansas, have invented a new and Improved Tractor Guide, of which the following is a description.

My invention relates to a tractor guide to run in the furrow. The invention has for an object to provide a guide of the indicated character improved in various particulars whereby to maintain a tendency in the guide to move toward the land side of the furrow as well as a tendency to move downward whereby to overcome any tendency of the guide to jump from the furrow.

A further object of the invention is to provide a structural embodiment of the invention having appurtenances to readily secure it to a tractor element and provided with means to raise the guide wheels or disks out of the furrow for turning at the end of the field and for again lowering the guide wheels or disks as well as to provide for a lateral adjustment of the member carrying the guide wheels and adjust the guide wheels as a unit toward the land side.

Reference is to be had to the accompanying drawings forming a part of this specification, it being understood that the drawings are merely illustrative of one example of the invention.

Figure 1 is a plan view of a tractor guide embodying my invention showing the same in association with tractor parts and indicating its position in a furrow;

Figure 2 is a side elevation of an attachment of the tractor parts as shown in Figure 1;

Figure 3 is a front end view of the tractor guide.

In carrying out my invention in accordance with the illustrated example an elongated supporting member 10 is provided, advantageously consisting in practice of a short length of pipe. On said supporting member 10 is a sleeve 11 slipped onto said member from the front end and secured in position by a set screw 12 or the like. On the sleeve 11 is a lateral lug 13 through which projects upwardly a spindle 14 slightly inclined to the vertical, the spindle being adapted to be held in adjusted position in the lug 13 by a set screw 15 or equivalent means. The spindle 14 carries at its lower end a disk wheel 16 which is thus suspended from the member 10. The wheel 16 is adapted to run edgewise against the land side *a* of the furrow and said wheel is dipped slightly toward the front so as to turn in a plane convergent to the bottom of the furrow.

In order to constrain the wheel 16 to run against the land side a second wheel 22 is provided at the front end of the member 10 as follows: A fitting 17 is applied at the extreme end of the member 10 and suitably secured thereto as by a set screw 18. Said fitting includes a front member 19 having a hole extending from top to bottom thereof which receives the upwardly extending member of elbow spindle 20, the horizontal member of which spindle is provided with a wheel 22. The spindle 20 is secured to the member 19 by a set screw 21, the loosening of which permits adjustment of the angular disposition of wheel 22. Wheel 22 in practice is so disposed as to turn in a plane convergent toward the land side *a* whereby the wheel has a tendency to work toward the land side and thereby maintain the edge of the wheel 16 against the land side. Thus, said wheel 16 constantly is constrained to run with its side edge against direct contact with the land side *a* and by reason of said wheel dipping downwardly toward the front, it tends to work downwardly and thereby resists any tendency of the member 10 and the wheels 16, 22 to jump as a unit from the furrow.

The rear end of the elongated member 10 of the guide has a fitting 23 applied thereto, the rear end of which fitting is formed with a round head 24 which is received on a similar head 25 on a yoke 28. The opposed faces of the heads 24, 25 are toothed or ribbed as at 26 to interlock and the heads are secured tightly by an approximately vertical bolt 27. By loosening the bolt 27 the member 10 with the wheels 16, 22 may be turned laterally with said bolt as an axis to properly dispose the wheel 16 relatively to the land side of the furrow. The yoke 28 is of clevis-like form and its arms are received on a lateral spindle 29 which is formed with a sleeve 30 fitting on an elongated fixed member 31 appurtenant to the tractor, the letter *b* indicating the tractor wheel and *c* a fragment of the spindle of the tractor wheel.

The fitting 23 has a boss 33 rising therefrom at the top, said boss receiving a post 34 to which a cable or rope 35 is secured which in practice runs to a point adjacent the tractor seat (not shown) so that a pull on the rope may be exerted by the driver for raising the guiding unit out of the furrow at the end of the field. Said unit turns about the spindle 29 as an axis in the raising and lowering of the unit.

The member 31 on the tractor has a brace 36 of elbow shape held by a clamp jaw 37 and clamp screws 38 to a clip or fitting 39 depending from the spindle c, the upper end of said brace including a sleeve 40 on the element 31, said sleeve having a set screw 41.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A tractor guide including a supporting means, and a wheel suspended from said supporting means and disposed at a slight angle to the horizontal, said wheel adapted to contact with its side edge against the land side of a furrow and dipping forwardly tending to have a downward direction.

2. In a tractor guide, an elongated supporting element, a sleeve fitting said element, a depending member carried by said sleeve, and a wheel turnable with said depending member as an axis; together with a wheel in advance of the first-mentioned wheel and adapted to make ground contact, said second-mentioned wheel mounted to revolve in a plane convergent to the path of travel and therefore convergent to the land side of a furrow.

3. A tractor guide including an elongated element, means at the forward end of said element adapted to be disposed in a furrow to engage the bottom and land side thereof, a head on the rear end of said element, a head below the first-mentioned head, said heads having their opposed surfaces provided with co-engaging members to lock the heads together, a bolt extending through said heads, a yoke carrying the second-mentioned head, and means to mount said yoke to permit vertical rocking thereof.

4. A tractor guide including an elongated element, guide means on said element adapted to enter a furrow, a vertically rockable element to which the first element is secured, a member having means to connect it with the spindle of a tractor wheel, and means on said member to rockably support said second-mentioned element; together with a vertically disposed elbow brace having means at its lower end to clamp it to a tractor beneath the wheel spindle, and means at its upper end to receive and support said elongated member.

JACOB WIENS BULLER.